United States Patent Office.

PROSPER DE WILDE, OF BRUSSELS, BELGIUM.

METHOD OF EXTRACTING GOLD.

SPECIFICATION forming part of Letters Patent No. 545,852, dated September 3, 1895.

Application filed November 17, 1894. Serial No. 529,089. (No model.) Patented in Belgium June 25, 1894, No. 110,684, and in England October 31, 1894, No. 20,872.

*To all whom it may concern:*

Be it known that I, PROSPER DE WILDE, a subject of the King of Belgium, and a resident of 339 Avenue Louise, Brussels, Belgium, have invented a certain new and useful Improved Method for the Extraction of Gold, (patented in Great Britain, No. 20,872, dated October 31, 1894, and in Belgium, No. 110,684, dated June 25, 1894,) of which the following is a specification.

The object of my invention is a method for the extraction of gold, and the manner in which it is carried out is particularly described in all its details in the following description.

*First operation—Dissolving the gold.*—Instead of dissolving the gold existing in the ores or "tailings," as is done at the Transvaal, in a weak solution containing only cyanide of potassium or of sodium, (KCy or NaCy,) I employ in the preparation of this solution ordinary water which has been in contact by stirring for some minutes with minium ($Pb_3O_4$) or with protoxide of lead (PbO), preferably of the variety known under the name of "Massicot." The cyanide of potassium or of sodium may be first dissolved in the water, and the solution thus obtained put into contact with the minium or the protoxide of lead. Care should be taken to stir frequently, and the solution employed is decanted after the precipitation of the oxide of lead. In a solution thus obtained the gold contained in the ores or the tailings is dissolved very rapidly, and large economies in the employment of cyanide may be effected. The formula of the reaction is:

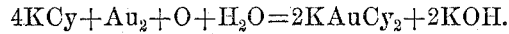

$4KCy + Au_2 + O + H_2O = 2KAuCy_2 + 2KOH.$

*Second operation—Utilization and recovery of the alkali cyanide in excess.*—Only a very very small portion of the alkali cyanide used for dissolving the gold is really utilized, and the major part is lost in the solutions which are emptied away as residues, notwithstanding the fact that they contain a terrible poison.

In my method the cyanide in excess is recovered and utilized in the following manner: The solution resulting from the first operation, which contains the dissolved gold in the form of double cyanide of gold and potassium or of sodium, ($AuKCy_2$ or $AuNaCy_2$,) is carefully added to, while stirring, by a solution of about ten per cent. of ferrous chloride ($FeCl_2$) or ferrous sulphate, ($FeSO_4$ green vitriol.) A yellow orange precipitate is first obtained, which soon becomes green and flocculent. A small quantity of the liquid is filtered from time to time, and a few drops of the filtrate are treated with a weak solution of cyanide of potassium or a weak solution of red prussiate of potassium. When with the first reagent a yellowish tint or a bluish tint with the second reagent is produced, the precipitation may be considered finished.

The following is the formulæ of the precipitation:

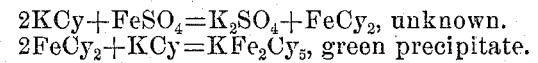

$2KCy + FeSO_4 = K_2SO_4 + FeCy_2$, unknown.
$2FeCy_2 + KCy = KFe_2Cy_5$, green precipitate.

The green precipitate, formed of a combination of alkali cyanide and ferrous cyanide, is rapidly deposited. This precipitate is separated from the liquid by means of a filter-press or a vacuum-filter. It is afterward diluted in ordinary water acidulated by sulphuric acid. It is thus instantly transformed into prussian blue. This latter is washed in water, separated by the filter-press, and drained in the well-known manner. The green precipitate diluted in water may also be treated by a solution of caustic potash or of caustic soda. A precipitate of hydroxide of iron is obtained and a solution of yellow prussiate of potassium or of sodium ($Cy_6FeK_4$ or $Cy_6FeNa_4$). After separation of the hydroxide of iron by the well-known means the yellow prussiate may be crystallized by evaporation and cooling in the known manner. The yellow prussiate may, by well-known means, be transformed into cyanide of potassium or of sodium to again serve for the extraction of gold.

*Third operation—Precipitation of the gold.*— The solution from the filter-press or from the vacuum-filter in the second operation contains all the dissolved gold in the form of double cyanide of gold and of potassium or of sodium ($AuKCy_2$). Instead of precipitating the gold by means of zinc shavings, I acidulate the solution by dioxide of sulphur, ($SO_2$,) or by a solution of sulphurous acid, ($SO_3H_2$,) or by kalium or natrium metasulphite, ($S_2O_5K_2$ or $S_2O_5Na_2$,) or by any acid sulphite, after which I add a solution of cupric salt, like cupric sulphate or blue vitriol, ($CuSO_4$,) until I obtain on a portion of filtered liquid the characteristic brown reaction by means of yellow prussiate of potassium. A solution of cuprous chloride ($Cu_2Cl_2$) in weak muriatic acid may also be employed even without the intervention of sulphurous acid or its acid salts. In either case I obtain by stirring a white caseous precipitate formed of a mixture of aurous cyanide (AuCy) and cuprous cyanide (CuCy), containing all the gold which was dissolved in the first operation.

The formulæ of the reactions are as follows:

(1) $2(KCy.AuCy) + CuSO_4 = K_2SO_4 + 2AuCy + CuCy_2$, (cupric cyanide.)

Cupric cyanide is reduced to cuprous cyanide by sulphurous acid.

(2) $2(KCy.AuCy) + Cu_2Cl_2 = 2KCl + 2AuCy + 2CyCu$, (cuprous cyanide.)

After a washing and desiccation the precipitate may be calcined in a reverberatory furnace. It is transformed into a mixture of gold and cupric oxide (Au+CuO). The calcined product, heated with hot diluted sulphuric or nitric acid, will leave the gold as residue and cupric oxide will be dissolved. The chemical formula will be:

$Au + CuO + SO_4H_2 = SO_4Cu + H_2O + Au$.

The precipitate of aurous and cuprous cyanides may also be attacked in its hot condition by sulphuric acid at 60° Baumé the two cyanides become decomposed and pure gold remains as a residue.

By another plan the precipitate may be treated by diluted muriatic acid or nitric acid, which only dissolves the cuprous cyanide. The aurous cyanide, after washing and draining, yields pure gold by calcination.

None of the above treatments or operations cause any notable loss of gold.

Advantages of my method: (a) All the gold is obtained in a pure state; (b) the expenses are less than with existing methods; (c) a very large part of the alkali cyanide which hitherto has been lost is recovered in the form of prussian blue or yellow prussiate; (d) the waste solutions contain no venomous ingredients.

What I claim, and desire to secure by Letters Patent, is—

The precipitation of gold in the form of a mixture of aurous cyanide and cuprous cyanide by acidulating a cyanide solution containing the gold with an acid sulphurous compound and afterward adding a solution of copper salt, all substantially as described.

In witness whereof I have hereto signed my name, in the presence of two subscribing witnesses, this 6th day of November, 1894.

PROSPER DE WILDE.

Witnesses:
 GUST. PIERE,
 GREGORY PHELAN.